Patented Dec. 8, 1931

1,835,682

UNITED STATES PATENT OFFICE

EDWARD C. ZUCKERMANDEL, OF MIDLAND, MICHIGAN, ASSIGNOR TO THE DOW CHEMICAL COMPANY, OF MIDLAND, MICHIGAN, A CORPORATION OF MICHIGAN

PRESERVATIVE

No Drawing.    Application filed November 20, 1930.    Serial No. 497,069.

The present invention is concerned with the preservation of tetrachlorethylene, which substance I have found, when exposed to heat, light, moisture or air or during distillation, to decompose or be otherwise changed thereby. I have found that, by dissolving therein small quantities of paraffin hydrocarbons, such decomposition may be substantially prevented. To the accomplishment of the foregoing and related ends, the invention, then, consists of the features hereinafter fully described and particularly pointed out in the claims, the following description setting forth in detail approved combinations of ingredients embodying my invention, such disclosed combinations constituting, however, but several of various forms in which the invention may be used.

Tetrachlorethylene ($C_2Cl_4$) when exposed to daylight in contact with moisture and air gives a distinct odor of phosgene in six to eight days, and a faint cloudiness when shaken with an aqueous solution of silver nitrate. When relatively small amounts, e. g. as little as one-half per cent or less, of a paraffin hydrocarbon were dissolved in the tetrachlorethylene, however, no odor of phosgene was perceptible, nor was a test for chlorides obtained, when the treated material was exposed as described above for six months or longer.

In carrying out my invention, for example, one-half per cent by volume of a purified liquid paraffin of specific gravity .84 at 25° C., was dissolved in the tetrachlorethylene and the solution exposed in the manner previously indicated at room temperature, i. e., 16° to 18° C., for three months. When tested in the usual way for decompositon products, e. g. by the odor evolved and by shaking with an aqueous silver nitrate solution, no appreciable tests therefor were obtained. In another instance, one per cent by volume of a liquid petrolatum of specific gravity .86 at 25° C. was dissolved in tetrachlorethylene and the resulting solution exposed as stated above at a temperature between 50° and 55° C. The solution after six months of such exposure showed no decomposition in any way. Larger amounts of the paraffins than that specified in the foregoing examples may be used when more extreme conditions of exposure are to be encountered, even as much as ten per cent or more, but for most purposes an addition of from 0.1 to 1 per cent by volume of the hydrocarbon will be found sufficient.

The purified liquid paraffin or petrolatum, or mixtures thereof, preferably employed in carrying out my invention have a specific gravity of from .82 to .91 at 25° C. For other properties of the same, reference is made to U. S. Pharmacopœia, 1926, edition, pages 281–282. The tetrachlorethylene treated in accordance with the invention may also contain substantial quantities of other chlorinated compounds such as trichlorethylene ($C_2HCl_3$), pentachlorethylene ($C_2HCl_5$), or other compounds which are naturally associated or grouped therewith.

It is understod that I do not limit by invention to the above examples, which are merely set forth for the purpose of illustration. Other paraffin oils such as gasoline, kerosene or equivalent paraffin hydrocarbons or mixtures thereof, as indicated in the foregoing specific gravity range as well as different proportions of such hydrocarbons, will be found applicable under varying conditions for preserving tetrachlorethylene according to the invention.

Other modes of applying the principle of my invention may be employed instead of those explained, change being made as regards the materials employed, provided the ingredients stated by any of the following claims or the equivalent of such stated ingredients be employed.

I therefore particularly point out and distinctly claim as my invention:—

1. As a composition of matter, tetrachlorethylene containing a relatively small amount of a paraffin hydrocarbon dissolved therein.

2. As a composition of matter, tetrachlorethylene containing a relatively small amount of a liquid paraffin hydrocarbon dissolved therein.

3. As a composition of matter, tetrachlorethylene containing a relatively small amount of a purified liquid petrolatum of specific gravity of .82 to .91 at 25° C. dissolved therein.

4. As a composition of matter, tetrachlorethylene containing from about one-tenth to ten per cent by volume of a purified liquid petrolatum of specific gravity of about .82 to .91 at 25° C. dissolved therein.

5. The method of preserving tetrachlorethylene which comprises mixing therewith a relatively small amount of a paraffin hydrocarbon.

6. The method of preserving tetrachlorethylene which comprises mixing therewith a relatively small amount of a liquid paraffin hydrocarbon.

7. The method for preserving tetrachlorethylene which comprises dissolving therein a relatively small amount of a purified liquid petrolatum of specific gravity of .82 to .91 at 25° C.

8. The method for preserving tetrachlorethylene which comprises dissolving therein about one-tenth to ten per cent by volume of a purified liquid petrolatum of specific gravity of .82 to .91 at 25° C.

Signed by me this 12th day of November, 1930.

EDWARD C. ZUCKERMANDEL.